United States Patent
Wang et al.

(10) Patent No.: US 7,798,697 B2
(45) Date of Patent: Sep. 21, 2010

(54) BACKLIGHT MODULE AND DISPLAY APPARATUS HAVING THE SAME

(75) Inventors: Chih-Lin Wang, Hsinchu (TW); Chun Chang Hung, Hsinchu (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 12/247,880

(22) Filed: Oct. 8, 2008

(65) Prior Publication Data
US 2009/0196068 A1 Aug. 6, 2009

(30) Foreign Application Priority Data
Feb. 1, 2008 (TW) .............................. 97104079 A

(51) Int. Cl.
*F21V 8/00* (2006.01)

(52) U.S. Cl. ...................................... 362/612; 362/613

(58) Field of Classification Search .................. 362/611, 362/612, 613
See application file for complete search history.

(56) References Cited

U.S. PATENT DOCUMENTS

| 7,097,339 | B2 * | 8/2006 | Chou et al. | 362/612 |
| 2005/0117320 | A1 * | 6/2005 | Leu et al. | 362/31 |
| 2006/0072315 | A1 | 4/2006 | Han et al. | |

FOREIGN PATENT DOCUMENTS

CN 1504803 A 6/2004

\* cited by examiner

*Primary Examiner*—Laura Tso
(74) *Attorney, Agent, or Firm*—Ingrassia Fisher & Lorenz, P.C.

(57) ABSTRACT

A backlight module is provided. The backlight module includes a light guide plate, an optical component, and a light source for generating light. The optical component is provided for adjusting or veering the light emitted from the light source along a direction perpendicular to the light guide plate. One end of the optical component is affixed to the light source for receiving the incident light. The other end of the optical component faces, and is separated from, the light guide plate, so as to direct the light to the light guide plate.

12 Claims, 4 Drawing Sheets

BACKLIGHT MODULE AND DISPLAY APPARATUS HAVING THE SAME

CROSS REFERENCE TO RELATED APPLICATIONS

This application claims the right of priority based on Taiwan Patent Application No. 097104079 entitled "BACKLIGHT MODULE AND DISPLAY APPARATUS HAVING THE SAME", filed on Feb. 1, 2008, which is incorporated herein by reference and assigned to the assignee herein.

FIELD OF INVENTION

The present invention relates to a backlight module and a display apparatus having the same; particularly, the present invention relates to a backlight module adopting LED light source and a display apparatus having the same.

BACKGROUND OF THE INVENTION

A liquid crystal display (LCD) device has various advantages, for example, a high resolution, low driving voltage, low power consumption, thin thickness, small volume and light weight as compared with a cathode ray tube (CRT) device, making it ideal for use in a variety of applications, such as portable computers, communication devices, mobile devices, television sets, etc.

Generally, the LCD device includes two main parts: a liquid crystal panel and a backlight module. The backlight module is employed for providing planar light source of a uniform luminance into the LCD panel. When such a light is incident into the panel from the backlight module, a uniform image is displayed through an entire effective display area of the panel.

The backlight assembly may include a light guide plate and a light source for generating light. For example, the light source may be a cold cathode fluorescent lamp (CCFL) or a light emitting diode (LED). The LED is usually employed for a display device having a relatively small display unit, such as a mobile communication device, to thereby reduce the volume and the power consumption thereof. It is observed that large-size LCD TVs on the market are starting to adopt LEDs as backlight.

FIG. 1 is a side view of a conventional LED backlight module 100, which includes a LED light source 102 and a light guide plate 104. A light generated from the LED typically corresponds to a point light and has a large divergent angle θ, around 110 to 120 degrees (measured based on FWHM of the luminosity). However, the thickness of the light guide plate 104 is around 0.4 to 2.0 mm, which is quite thin relative to the large divergent angle of the LED light source 104, so that only a limited portion of light is coupled into the light guide plate 104, resulting in low coupling efficiency.

The conventional solutions increase the brightness or the numbers of LED to increase the total output from backlight module. However, inevitably they would add up the manufacture cost and make the circuit design more complicated. Therefore, it is desired to have a new, inexpensive, and simple-implemented backlight module to solve aforementioned problems.

SUMMARY OF THE INVENTION

Various embodiments related to providing a backlight module and a display apparatus having the same. The backlight module has a light source, a light guide plate, and an optical component. In one aspect, the light is adjusted or veered along a direction perpendicular to the plane of light guide plate, so as to allow more light emitted from the light source to enter the light guide plate and thus raise the coupling efficiency. In another aspect, an optical component is disposed between the light source and the light guide plate to adjust or veer the light emitted from the light source.

In one embodiment, what disclosed is a backlight module including a light guide plate, an optical component, and a light source for generating light. The optical component is provided for adjusting or veering the light emitted from the light source along a direction perpendicular to the light guide plate. One end of the optical component is affixed to the light source for receiving the incident light. The other end of the optical component faces, and is separated from, the light guide plate, so as to direct the incident light to the light guide plate. Particularly, the optical component can be implemented as a cylindrical lens for focusing the incident light in the direction perpendicular to the plane of light guide plate.

In another embodiment, disclosed is a display apparatus having a backlight module. The backlight module includes a light guide plate, an optical component, and a light source for generating light. The optical component is provided for adjusting or veering the light along a direction perpendicular to the plane of light guide plate. One end of the optical component is affixed to the light source for receiving the incident light. The other end of the optical component faces, and is separated from, the light guide plate, so as to direct the light to the light guide plate. Particularly, the optical component can be implemented as a cylindrical lens.

The foregoing and other features of the invention will be apparent from the following more particular description of embodiment of the invention.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION

Figure 1:
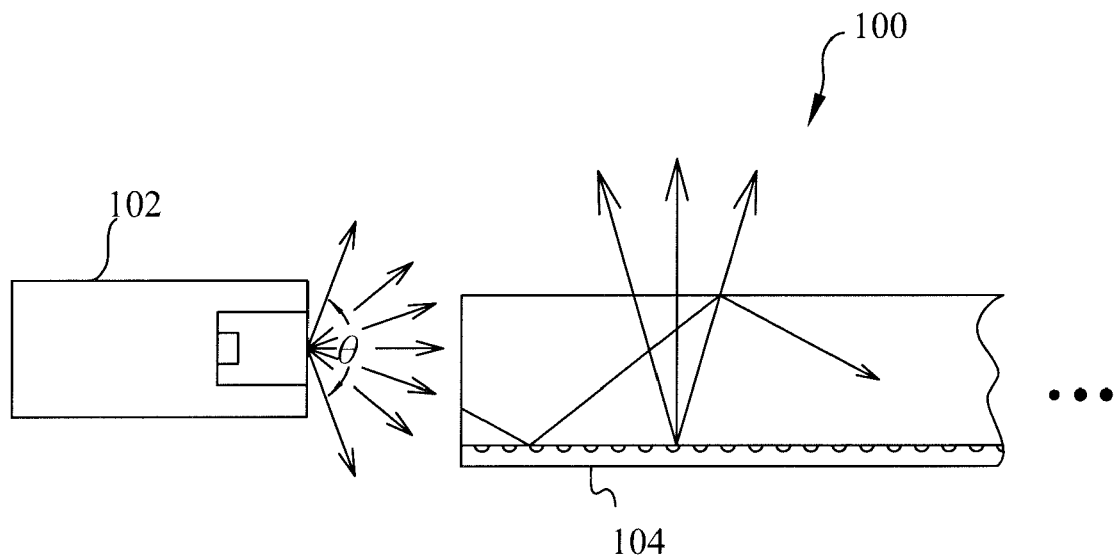
FIG. 1 illustrates a conventional backlight module.
Figure 2A:
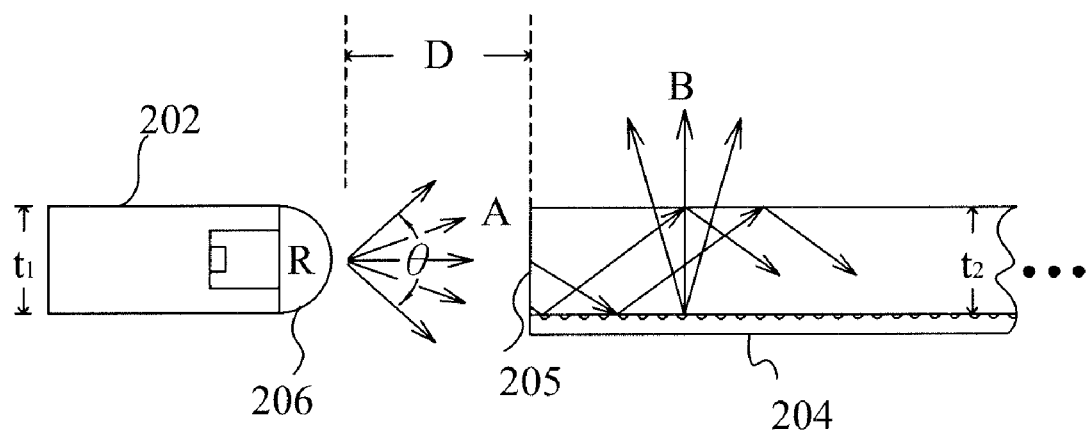
FIG. 2A is a side view of the display apparatus according to an embodiment of the present invention.
Figure 2B:
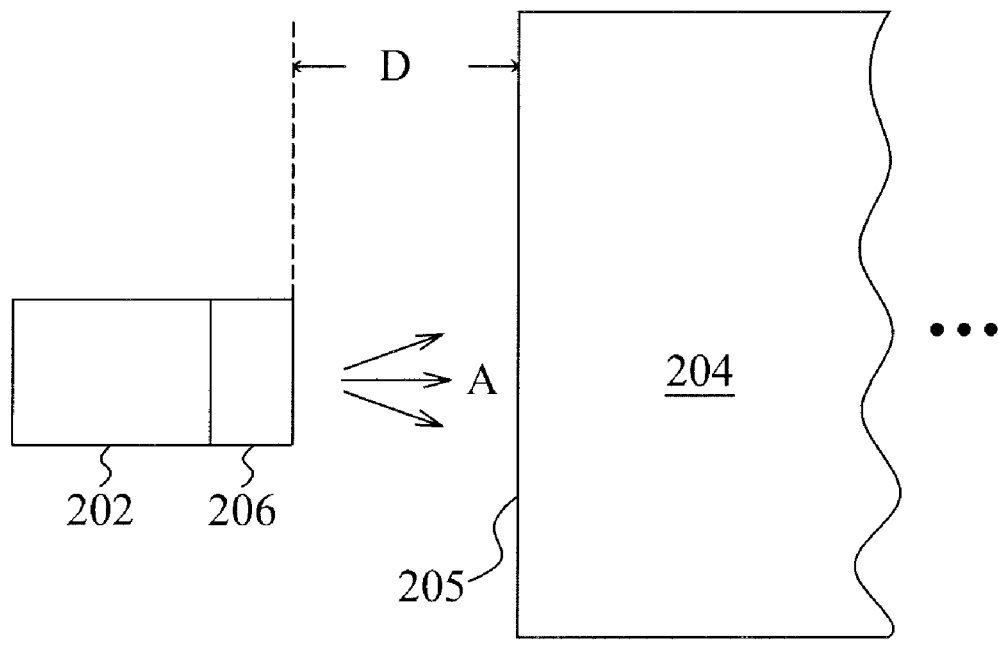
FIG. 2B is a top view of the display apparatus according to an embodiment of the present invention.
Figure 2B:
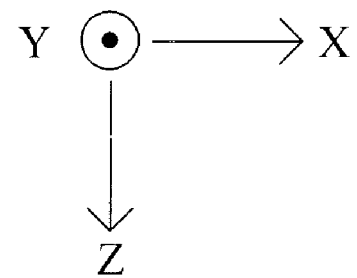

As known to those skilled in the art, the display apparatus 20 illustrated in FIGS. 2A and 2B is preferably a liquid crystal display apparatus and can be incorporated into a mobile phone, a personal digital assistant (PDA), a notebook computer, a desktop computer, a television, a car media player, a portable video player, a digital camera, a global positioning system (GPS), an avionics display, etc. Note that the present invention is illustrated by way of example and not intended to be limited by the figures of the accompanying drawing. The scales, the sizes, and the relative positions of the illustrative elements in the drawing should not limit the scope of the present invention.

As shown in FIG. 2A, in order to display an image, the display apparatus 20 has a backlight module 200 to provide a planar light of a uniform luminance B into the panel (not shown) of the display apparatus 20. A perspective view of the display apparatus 20 can be seen in FIG. 2C.

The backlight module 200 includes a light guide plate 204, an optical component 206, and a light source 202 for generating light, which is to be coupled into the light guide plate 204 via the optical component 206. The light source 202 could be a light emission diode (LED) of red-, green-, or blue-light. Preferably, the light source 202 is a white-light LED. Note that the number or the size of the light source 202 should not limit the present invention. According to the size and the intended purpose of the display apparatus 20, those skilled in the art should be able to select appropriate LED light sources for the backlight module. In the following description for the exemplary purpose, the light source 202 is a single white light LED. Preferably, LED 202 is a side-view LED, with thickness of 0.2 mm to 2.0 mm. Disposed on a circuit board (e.g., a flexible print circuit board, not shown), LED 202 is further connected to a control circuit (not shown either). To minimize the thickness of the product and to save the assembling cost, side-view LEDs are generally adopted in the display for the mobile device. Meanwhile side-view LEDs should be known to those skilled in the art and the details of the side-view LED are omitted thereinafter.

As shown in FIG. 2B, the light guide plate 204 has a plain side 205 to receive the light A, which is emitted from the light source 202 and passed by the optical component 206. Further referring to FIG. 2C, the reflective plate and light guide structure in the light guide plate 204 transform the light A into planar light of a uniform luminance for the panel (not shown) of the display apparatus 20. In other embodiments, the side 205 is not plain, but is formed as other geometrical structures to make the light incident to the light guide plate 204 even uniform.

Now refer back to FIG. 2A. In the embodiment, the light guide plate 204 is a plain plate with thickness of 0.4 mm, 0.6 mm, or 0.8 mm. Generally, the thickness t2 of the light guide plate 204 is substantially equal to the height t1 of LED 202 (but may be larger or less than height t1). In other embodiments, the light guide plate 204 has a wedge structure, which has the thickest end on the side 205 and gets thinner away from the side 205.

One end of the optical component 206 is affixed to the light source 202 for receiving the light. The other end of the optical component 206 faces, and is separated from the side 205 for a distance D, so as to direct the light to the light guide plate 204. The optical component 206 is provided for adjusting or veering the light from the light source 202 in the direction perpendicular to the plane of light guide plate 204.

Figure 2C:
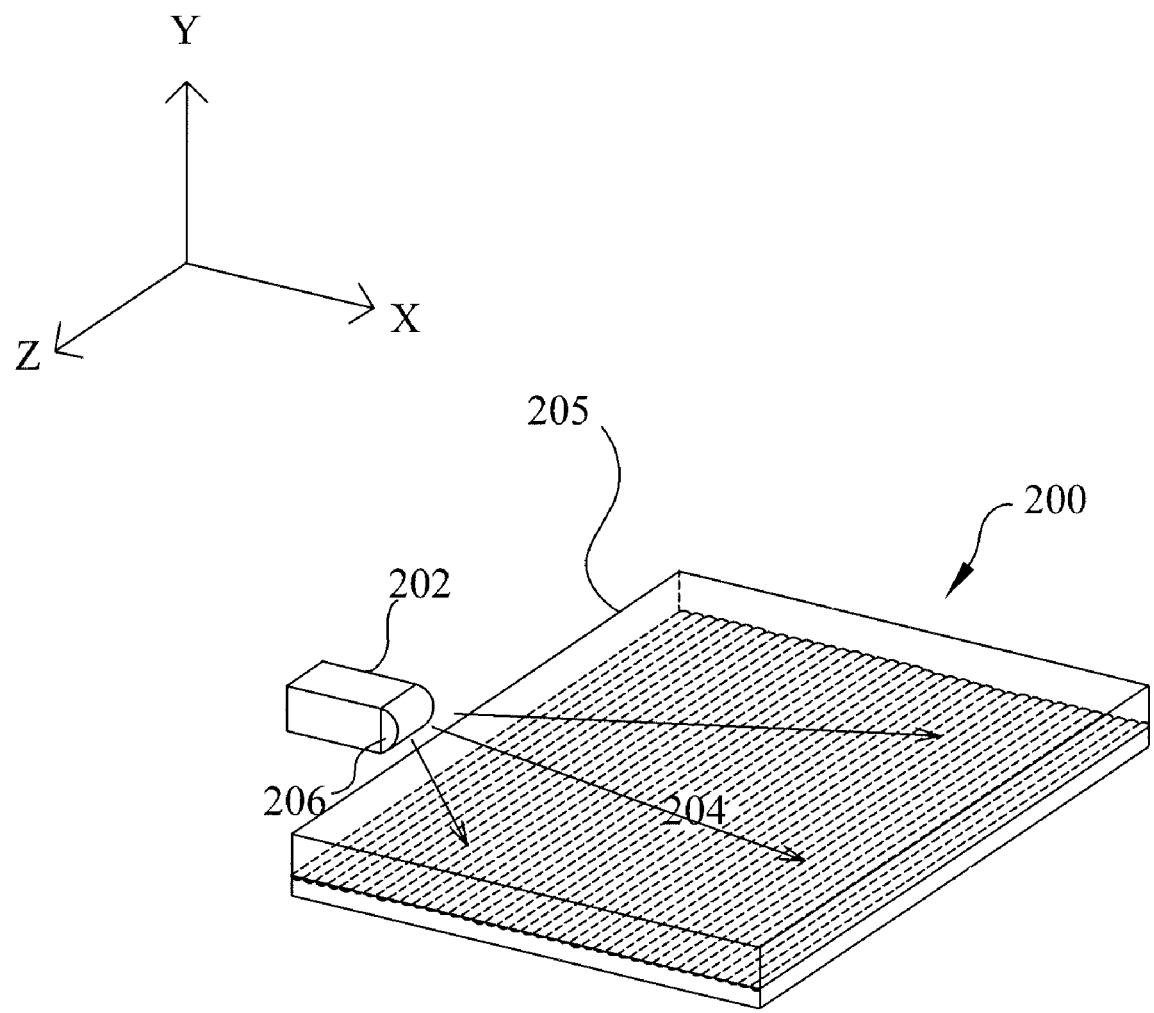
FIG. 2C is a perspective view of the display apparatus according to an embodiment of the present invention.

Referring to FIGS. 2B and 2C, the light guide plate 204 is disposed on the x-z plane, and the optical component 206 (shown in FIG. 2A) directs the light in y-direction. In one embodiment, the optical component 206 adjusts the divergent angle θ in the y-direction. In the embodiment shown in FIG. 2A, the optical component 206 is a cylindrical lens for focusing the incident light, i.e., narrowing the divergent angle θ in y-direction, and for adjusting the incident angle corresponding to the position of the side 205, so as to successfully couple a larger amount of light into the light guide plate 204, compared with the prior art. Note that in various embodiments, the optical component is not limited to lens, and could be implemented as refractive elements, diffractive elements (like optical gratings), or the combination thereof.

Various embodiments will be made clearer by the following example with the cylindrical lens 206, which has a convex surface facing said light guide plate 204 and has a plain surface facing said light source 202. In FIG. 2A, one end (the plain surface) of the cylindrical lens 206 is affixed, by general optical glue, to the LED 202 for receiving the light. In another embodiment, the cylindrical lens 206 is integratedly formed with the LED 202 by molding for encapsulating the LED 202.

The other end (the convex surface) of the cylindrical lens 206 faces the light guide plate 204. Meanwhile it is separated from the light guide plate 204 for a distance D (around 0.3 mm, depending on the mechanical design), so as to direct the light from the light source 202 to the light guide plate 204. Once the distance D is given, the coupling efficiency of the light guide plate 204 is further determined by the radius of the curvature R of the convex surface of the cylindrical lens 206. In a preferred embodiment, the radius of the curvature R is not smaller than the distance D. Meanwhile, the thickness t2 of the light guide plate 204 affects the coupling efficiency. Generally speaking, a larger thickness results in a better coupling efficiency. In alternative embodiments, when D is 0.3 mm and the thickness t1 is around 0.6 to 0.8 mm, the radius of the curvature R can be selected from 0.3 mm, 0.4 mm. 0.5 mm, 0.6 mm, and 1 mm, and the thickness t2 can be selected from 0.8 mm, 1.2 mm, 1.6 mm, 2.0 mm, and 2.4 mm.

With the embodiments described above, various embodiments provide a backlight module and a display apparatus having the same. The coupling efficiency of the light guide plate is increased by adjusting or veering the incident light emitted from the light source along a direction perpendicular to the light guide plate. Compared to the conventional design, various embodiments are easy to implement without adding much cost.

While various examples been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

What is claimed is:

1. A backlight module, comprising:
   a light source for generating light;
   a light guide plate; and
   an optical component configured to adjust the light along a direction perpendicular to said light guide plate;
   wherein one end of said optical component is affixed to said light source for receiving the incident light, and the other end of said optical component faces, and is separated from said light guide plate, and wherein said optical component is a cylindrical lens having a radius of curvature not smaller than a distance between said cylindrical lens and said light guide plate so as to direct the light to said light guide plate.

2. A backlight module according to claim 1, wherein said optical component is provided for focusing the incident light.

3. A backlight module according to claim 1, wherein said cylindrical lens has a convex surface facing said light guide plate and has a plain surface facing said light source.

4. A backlight module according to claim 1, wherein said cylindrical lens is integratedly formed with said light source and is provided for encapsulating said light source.

5. A backlight module according to claim 1, wherein said light guide plate has a plain side for receiving said incident light.

6. A backlight module according to claim 1, wherein said light source is a side-view LED.

7. A backlight module according to claim 1, wherein said light source and said optical component are affixed to each other by optical glue.

8. A backlight module according to claim 1, wherein said optical component is integratedly formed with said light source and is provided for encapsulating said light source.

9. A display apparatus, comprising:
a backlight module, comprising:
a light source for generating light;
a light guide plate; and
a cylindrical lens configured to adjust the light along a direction perpendicular to said light guide plate;
wherein one end of said optical component is affixed to said light source for receiving the incident light, and the other end of said optical component faces, and is separated from said light guide plate at a distance, and wherein the cylindrical lens has a radius of curvature not smaller than the distance between said cylindrical lens and said light guide plate, so as to focus the incident light to said light guide plate.

10. A display apparatus according to claim 9, wherein said cylindrical lens has a convex surface facing said light guide plate and has a plain surface facing said light source.

11. A display apparatus according to claim 9, wherein said cylindrical lens is integratedly formed with said light source and is provided for encapsulating said light source.

12. A display apparatus according to claim 9, wherein said light guide plate has a plain side for receiving said incident light.

* * * * *